(12) United States Patent
Uehara et al.

(10) Patent No.: US 8,780,025 B2
(45) Date of Patent: *Jul. 15, 2014

(54) DISPLAY DEVICE

(75) Inventors: Toshinori Uehara, Tottori (JP);
Kimitaka Kamijo, Tottori (JP); Keiji Takizawa, Azumino (JP); Tomoyuki Nakano, Tottori (JP); Kunio Maruyama, Azumino (JP); Hiroki Sugiyama, Tottori (JP)

(73) Assignee: Japan Display West Inc., Chita-gun, Aichi-ken (JP)

( * ) Notice: Subject to any disclaimer, the term of this patent is extended or adjusted under 35 U.S.C. 154(b) by 1376 days.

This patent is subject to a terminal disclaimer.

(21) Appl. No.: 12/008,822

(22) Filed: Jan. 14, 2008

(65) Prior Publication Data

US 2009/0009448 A1    Jan. 8, 2009

(30) Foreign Application Priority Data

Jan. 15, 2007  (JP) ................................. 2007-005449
Sep. 26, 2007  (JP) ................................. 2007-248569

(51) Int. Cl.
*G09G 3/36* (2006.01)

(52) U.S. Cl.
USPC ........................................ 345/87; 349/108

(58) Field of Classification Search
USPC ......... 345/87–104, 204, 690; 341/87; 349/84, 349/106, 108, 113
See application file for complete search history.

(56) References Cited

U.S. PATENT DOCUMENTS

| 7,936,423 B2* | 5/2011 | Kamijo et al. ................. 349/109 |
| 2006/0007096 A1* | 1/2006 | Kawaguchi et al. .......... 345/102 |
| 2006/0044240 A1 | 3/2006 | Takizawa et al. |
| 2007/0019138 A1* | 1/2007 | Kubo et al. .................... 349/114 |
| 2007/0124694 A1* | 5/2007 | Van De Sluis et al. ........ 715/775 |

FOREIGN PATENT DOCUMENTS

| CN | 1743915 | 3/2006 |
| JP | 11-101992 | 4/1999 |
| JP | 2004-061796 | 2/2004 |
| JP | 2006-301343 | 11/2006 |

* cited by examiner

*Primary Examiner* — Stephen Sherman
(74) *Attorney, Agent, or Firm* — K&L Gates LLP (57) ABSTRACT

Light reflecting layers 45a that totally reflect light are provided inside the subpixels 10 disposed in particular regions on an inner face of a TFT array substrate 4, and light reflecting layers 45b that scatter light are provided inside the subpixels 10 other than those. Thanks to this, the reflectance of the light reflecting layers 45a can be rendered different from that of the light reflecting layers 45b. As a result, differences can be created in the display light formed by the light reflecting layers 45a and by the light reflecting layers 45b, by means of the light that is reflected thereat. Thereby, fine adjustment of the display light brightness and contrast is enabled, so that a liquid crystal display device 1 with extensive power of expression and superior display characteristics is provided.

3 Claims, 10 Drawing Sheets

DISPLAY DEVICE

BACKGROUND

1. Technical Field

The present invention relates to a display device.

2. Related Art

Liquid crystal display devices such as set forth in JP-A-11-101992 are widely used in the display units of mobile telephones and the like electronic equipment. When used as the display unit of a mobile telephone, for instance, they will display a wide variety images, including manufacturer logos and particular patterns, etc., on the standby and other screens.

In recent years, higher levels of design have been required of electronic equipment. Regarding mobile telephones, for example, proposals have been made to raise the design level of the equipment as a whole, including the display unit, by enabling not only display of images on the standby screen, but also display of such images when the power is turned off. In that case, a display unit possessing extensive power of expression would be needed in order to display images also when the power is off.

However, in liquid crystal display devices of the related art such as set forth in JP-A-11-101992, nothing is displayed when the power is turned off. To display images on the liquid crystal display device's display unit, it is necessary to drive the device with the power on. Therefore, extensive power of expression such as could display images while the power is off cannot be realized.

SUMMARY

An advantage of some aspects of the present invention is to provide a liquid crystal display device with superior display characteristics that possesses extensive power of expression able to display patterns including manufacturer logos and other identificatory symbols and the like even when the power is off.

According to an aspect of the invention, a display device includes a plurality of subpixels having light-reflective regions constituted of light reflecting layers, and a display area constituted of the subpixels arranged in a matrix, and has the innovative feature that, by means of the light reflecting layers, which are of at least two differing types, patterns are displayed in the display area when the display device is in a non-driven state.

With such aspect, there are, for example, first subpixels constituted of a first light-reflective pattern, and second pixels constituted of a second light-reflective pattern that is different from the first light-reflective pattern, which means that it is possible to make the light reflectance differ between the first subpixels and the second subpixels. Hence, it is possible to create differences in the display light that is formed by the first subpixels and second subpixels, by means of the light that is reflected thereat.

Thanks to such feature, in a liquid crystal display device or other display devices of various kinds, it will be possible, with the display device's power off—that is, in the non-driven state—to display identificatory or other patterns when incident light constituted of external light emerges, and thus a display device will be obtained that has superior display characteristics, possessing extensive power of expression.

Also, the display device's subpixels will preferably have light-transmissive regions as well as the aforementioned light-reflective regions.

With such feature, it will also be possible, by using, say, a separate light source, to display the usual images and so forth at the light-transmissive regions.

Also, the display device will preferably include a first substrate and a second substrate that are disposed opposing each other, and a liquid crystal layer that is sandwiched between the first and second substrates, and will have the feature that in the non-driven state, at least the light-reflective regions are in a normally white mode that is displayed as white.

With such feature, in what is known as a liquid crystal display device, which uses liquid crystals, the liquid crystal layer will be regulated so that at least the light-reflective regions will produce a white display in the non-driven state (will be in what is known as the "normally white mode"), which means: that, even in the non-driven state, light will be transmitted constantly at such portions regulated to give a white display. Thereby, in a liquid crystal display device it will be possible, in the non-driven state with the power off, to display identificatory or other patterns when incident light constituted of external light emerges, and thus a display device will be obtained that has superior display characteristics, possessing extensive power of expression.

According to another aspect of the invention, a display device includes a display area constituted of the subpixels arranged in a matrix, some of the subpixels comprising light-transmissive regions, and some of subpixels constituted only of light-reflective regions of light reflecting layers; and has the innovative feature that, by using at least two differing types of light-reflective layer for the subpixels that are constituted only of light-reflective regions, patterns are displayed in the display area when the display device is in the non-driven state.

With such aspect, the subpixels having light-transmissive regions will be used to produce the display device's usual displays in the driven state, while the subpixels constituted only of light-reflective regions will be used in the non-driven state to display identificatory or other patterns when incident light constituted of external light emerges, and thus a display device will be obtained that has superior display characteristics, possessing extensive power of expression.

Such display device will preferably include a first substrate and a second substrate that are disposed opposing each other, and a liquid crystal layer that is sandwiched between the first substrate and the second substrates, and will have the feature that in the non-driven state, at least the light-reflective regions are in a normally white mode that is displayed as white.

With such feature, in what is known as a liquid crystal display device, which uses liquid crystals, the liquid crystal layer will be regulated so that at least the light-reflective regions will produce a white display in the non-driven state (will be in what is known as the "normally white mode"), which means that, even in the non-driven state, light will be transmitted constantly at such portions regulated to give a white display. Thereby, in a liquid crystal display device it will be possible, in the non-driven state with the power off, to display identificatory or other patterns when incident light constituted of external light emerges, and thus a display device will be obtained that has superior display characteristics, possessing extensive power of expression.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the invention will now be described with reference to the accompanying drawings. The scales of the drawings are varied as appropriate to show the various members in discernible sizes.

First Embodiment

A first embodiment of the present invention is described below with reference to the drawings. The scales of the drawings are varied as appropriate to show the various members in discernible sizes.

Figure 1:
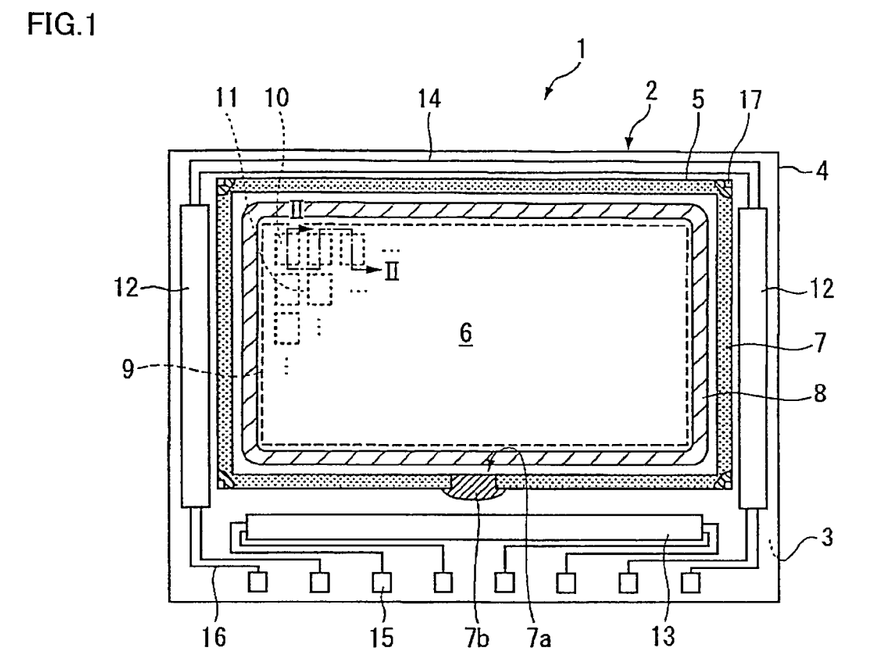
FIG. 1 is a plan view illustrating a structure of a liquid crystal display device in a first embodiment of the present invention.

FIG. 1 is a view illustrating the overall structure of a liquid crystal display device 1 of a first embodiment of the present invention. As an example for the purpose of description, this is an active matrix type semitransmissive reflecting type liquid crystal display device using thin film transistors ("TFTs" below) as switching elements.

As FIG. 1 shows, the liquid crystal display device 1 is structured with a liquid crystal panel 2 and a backlight 3 as main elements. The liquid crystal panel 2 and backlight 3 are disposed so as to be superposed when viewed from above, and in FIG. 1 only the liquid crystal panel 2 is visible.

The liquid crystal panel 2 has a structure such that a TFT array substrate (first substrate) 4 and a color filter substrate (second substrate) 5 are bonded together by means of seal material 7, and an area defined by the seal material 7 is filled with a liquid crystal layer 6. In a portion of the seal material 7 there is provided a pour hole 7a for pouring a liquid crystal. The pour hole 7a is sealed by sealant 7b. In an area at the insides of the seal material 7 there is provided a light-blocking film (peripheral shading) 8 constituted of a light-blocking material. An area inside the peripheral shading 8 is a display area 9 that displays images, moving pictures and the like. In the display area 9, multiple subpixels 10 are provided in a matrix arrangement. The spaces between the subpixels 10 are the interpixel spaces 11. Although in FIG. 1 the display area 9, which is formed with the subpixels 10 laid out in a matrix arrangement, is shown as being rectangular, it is not limited to being rectangular. For example, the subpixels 10 could equally well be laid out so that the display area 9 is circular or elliptical. It will also be appreciated that, naturally, what is termed a delta layout is included in what is here referred to as a matrix arrangement for the layout of the subpixels 10.

The periphery of the TFT array substrate 4 is an overhang region that protrudes out beyond the color filter substrate 5. At the left and right edges, as viewed in the figure, of this protruding region there are formed scan line drive circuits 12 that generate scan signals. Along the top edge, as viewed in the figure, is passed a wire 14 that connects the left and right scan line drive circuits 12. At the bottom edge, as viewed in the figure, there are formed a data line drive circuits 13 that generate data signals, and connection terminals 15 for connection to external circuits and the like. In an area between the scan line drive circuits 12 and the connection terminals 15 for connection to external circuits and the like, there are formed wires 16 for connecting the two. At each corner of the color filter substrate 5 there is provided inter-substrate conductive material 17 for electrically connecting the TFT array substrate 4 and the color filter substrate 5.

Figure 2:
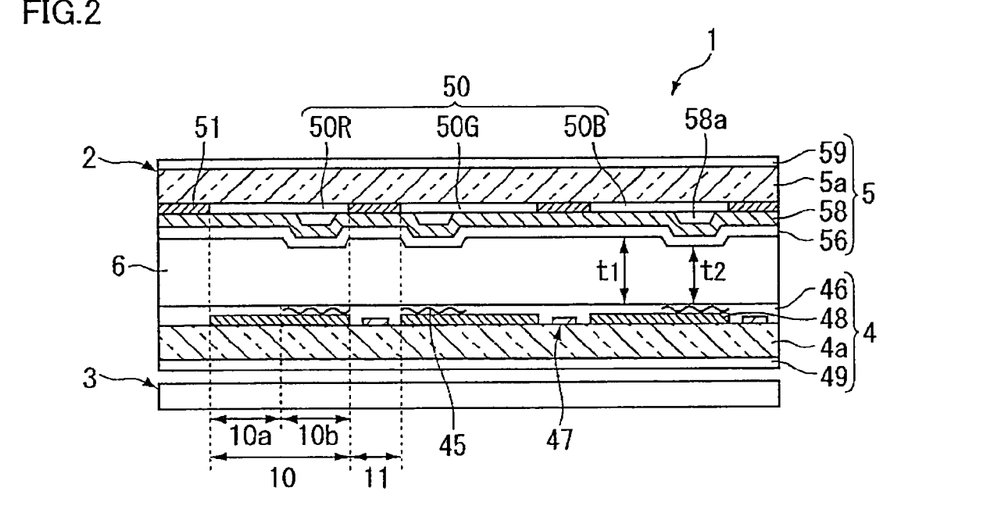
FIG. 2 is a cross-sectional view illustrating the structure of the liquid crystal display device in the first embodiment.

FIG. 2 is a view illustrating the structure along cross-section II-II in FIG. 1.

The TFT array substrate 4 is composed of, as main elements: a substratum 4a formed from a material of high translucency, say glass, quartz or the like; pixel electrodes 48 that are formed on the liquid crystal side of the substratum 4a; switching elements 47 that supply electrical signals to the pixel electrodes 48; light reflecting layers 45; an alignment film 46 that covers the pixel electrodes 48, switching elements 47 and light reflecting layers 45; and a polarization plate 49 that is bonded onto the outside (opposite side to the liquid crystal layer 6 side) of the substratum 4a.

The pixel electrodes 48 are disposed in regions overlying the subpixels 10, viewed from above, and are formed from a transparent conductive material, say indium tin oxide (ITO) or the like. The switching elements 47 are disposed inside the interpixel spaces 11, and are provided so as to correspond one-for-one with the pixel electrodes 48. Thus, the alignment of the liquid crystal layer 6 can be regulated independently at each subpixel 10. The switching elements 47 are constituted of, say, TFT, and are connected to scan lines or data lines not shown in the figure. The alignment film 46 is provided at the interface with the liquid crystal layer 6, and regulates the alignment of the liquid crystal molecules composing the liquid crystal layer 6. Although the switching elements 47 are here disposed inside the interpixel spaces 11, they are not limited to being disposed in this position, and could alternatively be disposed at the subpixels 10. More specifically, they could be disposed below the light reflecting layers 45 formed in light-reflective regions 10b to be described hereafter, or the pixel electrodes 48. If so, it will be possible to make the interpixel areas 11 smaller, since the switching elements 47 will then not impede the external light utilized for displays, or the light from the backlight 3.

The light reflecting layers 45 are metallic layers constituted of, say, aluminum or the like, and reflect light toward the color filter substrate 5. The light reflecting layers 45 are provided on the liquid crystal layer 6 side of the pixel electrodes 48, in regions occupying almost half of the interior of the subpixels 10 viewed from above, such regions being the light-reflective regions 10b. The regions where light reflecting layers 45 are not provided are light-transmissive regions 10a, through which light from the backlight 3 is transmitted to the liquid crystal layer 6 and color filter substrate 5. The outer faces (liquid crystal layer 6 side faces) of the light reflecting layers 45 are the reflective faces. A concavoconvex pattern is formed in such reflective faces. The light reflecting layers 45 are all of equal thickness. Although in FIG. 2 the light reflecting layers 45 are formed above the pixel electrodes 48, they could alternatively be formed below the pixel electrodes 48 if the pixel electrodes 48 possess transparency. Also, if there is electrical continuity between the pixel electrodes 48 of the light-transmissive regions 10a and the light reflecting layers 45, then at the light-reflective regions 10b, the light reflecting layers 45 could double as the pixel electrodes 48.

The color filter substrate 5 is composed of a substratum 5a, a color filter layer 50, a light blocking film 51, a common electrode 58, and an alignment film 56, as main elements.

The substratum 5a, like the substratum 4a, is a rectangular plate-shaped member formed from a material of high translucency, say glass, quartz or the like. The color filter layer 50 is provided on the liquid crystal layer 6 side of the substratum 5a so as to overlie the subpixels 10 viewed from above. The color filter layer 50 is made up of layers of three colors, say a red layer 50R, a green layer 50G, and a blue layer 50B.

Over each of the subpixels 10, one of the color filter layer 50's three color layers is provided, the red layer 50R, green layer 50G, and blue layer 50B each being laid out in rows that are adjacent. Three subpixels 10 that are adjacent to each other and possess the differing color layers of the color filter layer 50 form a set which constitutes one pixel.

The light-blocking film 51 is a light-blocking member constituted of material able to reflect or absorb light, and is provided around the periphery of the color filter layer 50. The common electrode 58 is formed from a transparent conductive material, say ITO or the like, and is provided so as to cover the color filter layer 50 and light-blocking film 51. Those regions of the common electrode 58 that, viewed from above, overlie the light reflecting layers 45 (the places where the slant lines are reversed in the figure), are formed so as to be slightly thicker than the other regions. As a result, the liquid crystal layer 6 gap t2 at the regions where the light reflecting layers 45 are provided is smaller than the liquid crystal layer 6 gap t1 at the other regions. The alignment film 56 is provided at the interface with the liquid crystal layer 6 and regulates the alignment of the liquid crystal molecules composing the liquid crystal layer 6 between itself and the alignment film 46.

The liquid crystal layer 6 is composed of liquid crystal molecules of fluorinated or non-fluorinated liquid crystal compound or the like, and is sandwiched between the two substrates so as to be in contact with both the TFT array substrate 4 side alignment film 46 and the color filter substrate 5 side alignment film 56. The alignment of the liquid crystal molecules is regulated by the alignment film 46 and alignment layer 56 so as to transmit light when in the non-driven state where no voltage is applied ("normally white mode").

Figure 3A:
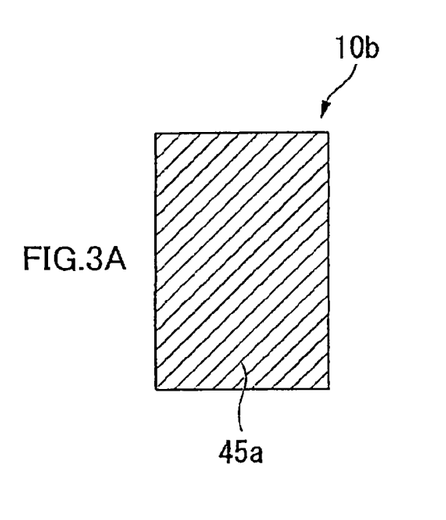
FIG. 3 is a pair of plan views illustrating a structure of portions of the liquid crystal display device in the first embodiment.
Figure 3B:
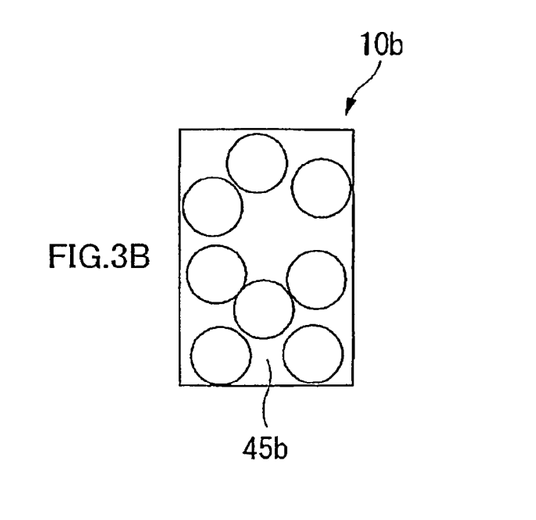

Next will be described more specifically the patterns of the light reflecting layers 45 in the liquid crystal display device 1 structured in the foregoing manner. FIGS. 3A and 3B show two types of reflective pattern that are formed on the reflecting surface of the light reflecting layers 45.

The reflective pattern of the light reflecting layer 45a shown in FIG. 3A has, say, a flat surface, and is a pattern (first light reflective pattern) designed so as to totally reflect light at the reflecting surface of the light reflecting layer 45a. The reflectance of all the light reflecting layers 45a is equal. The reflective pattern of the light reflecting layer 45b shown in FIG. 3B has, say, concavoconvexities disposed irregularly, and is a pattern (second light reflective pattern) designed so as to scatter light at the reflecting surface of the light reflecting layer 45b. The light reflecting layers 45a and light reflecting layers 45b are formed so that their reflectances will be different from each other in a direction perpendicular to the plane of the liquid crystal panel. By having a flat surface, the light reflecting layers 45a totally reflect light incidenting in a direction perpendicular to the plane of the liquid crystal panel, while the light reflecting layers 45b, by having concavoconvexities in their surface, diffusely reflect light incidenting in a direction perpendicular to the plane of the liquid crystal panel and therefore their reflectance in the direction perpendicular to the plane of the liquid crystal panel is low compared with the light reflecting layers 45a.

Figure 4:
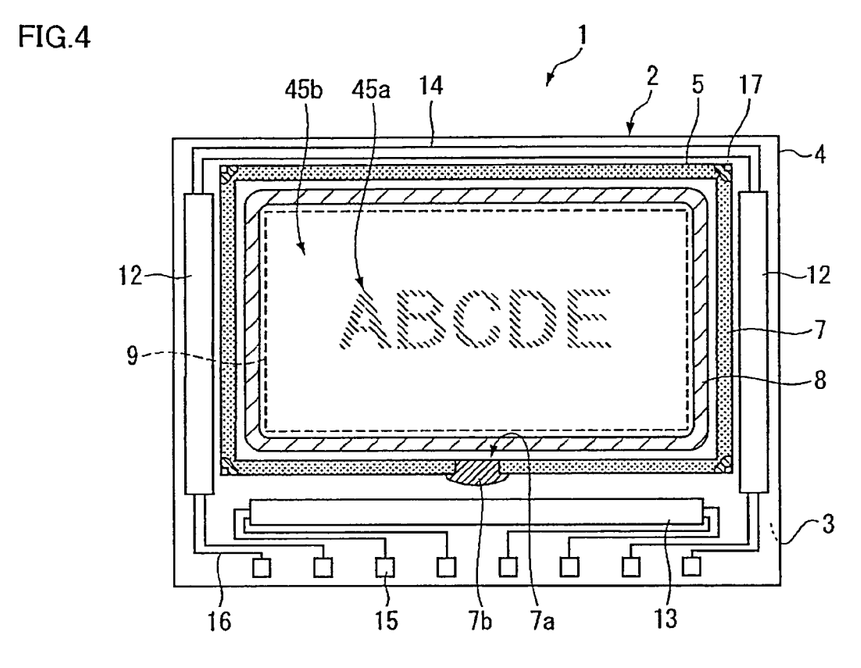
FIG. 4 is a plan view illustrating a structure of a portion of the liquid crystal display device in the first embodiment.

FIG. 4 shows a planar structure of the liquid crystal display device 1, being a view of the same kind as FIG. 1. The light reflecting layers 45a that totally reflect light are disposed at those subpixels 10 inside the display area 9 that are positioned at the portion indicated by slant lines in the figure (first subpixels), and the light reflecting layers 45b that scatter light are disposed at the subpixels 10 that are positioned at the other portions (second subpixels). Although in the present embodiment the light reflecting layers 45 are laid out so as to display ABCDE, they are not limited to layouts that display letters of the alphabet such as shown here. Specifically, they could alternatively be laid out so as to display a floral pattern or a checkerboard pattern or the like.

Figure 5:
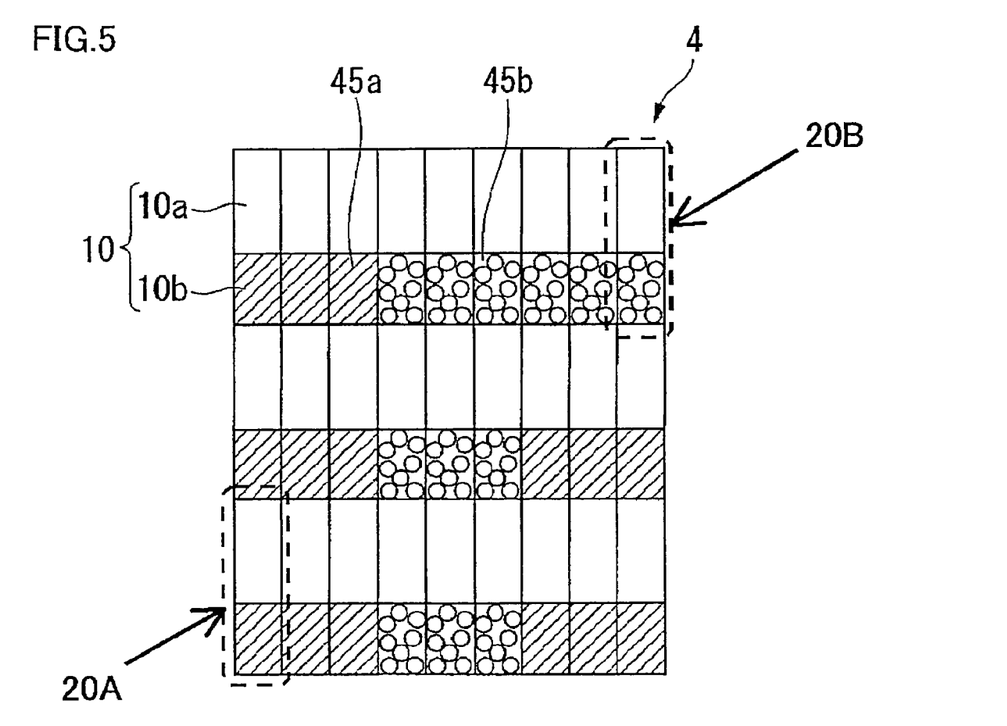
FIG. 5 is a plan view illustrating the structure of the liquid crystal display device in the first embodiment.

FIG. 5 is a view illustrating the structure of a portion of the TFT array substrate 4 in the liquid crystal display device 1.

In FIG. 5, the upper part (as viewed in the figure) of each of the plurality of subpixels 10 is the light-transmissive region 10a, and the lower part (as viewed in the figure) is the light-reflective region 10b. In the light-reflective regions 10b there are provided a light reflecting layer 45a that has the reflective pattern shown in FIG. 3A, and a light reflecting layer 45b that has the concavoconvex reflective pattern shown in FIG. 3B. The subpixels 10 that are provided with a light transmissive region 10a and a light reflective region 10b having a light reflecting layer 45a are designated as subpixels 20A, while the subpixels 10 that are provided with a light transmissive region 10a and a light reflective region 10b having a light reflecting layer 45b are designated as subpixels 20B.

Subpixels 20A are provided in all rows of the first, second and third columns from the left in the figure, and in the second and third rows of the first, second and third columns from the right in the figure. Subpixels 20B are provided in all rows of the fourth, fifth and sixth columns from the left in the figure, and in the first row of the first, second and third columns from the right in the figure. The regions where the light reflecting layers 45b are provided are indicated with slant lines in FIG. 5.

In the liquid crystal display device 1 structured in the foregoing manner, external light passes through the color filter layer 50 of the color filter substrate 5, and through the normally-white-mode liquid crystal layer 6. Light incidenting at the light-transmissive regions 10a among the subpixels 10 of the TFT array substrate 4 passes through the pixel electrodes 48 and substratum 4a, then is blocked by the polarization plate 49. Light incidenting at the light-reflective regions 10b is reflected by the light reflecting layers 45.

Figure 6:
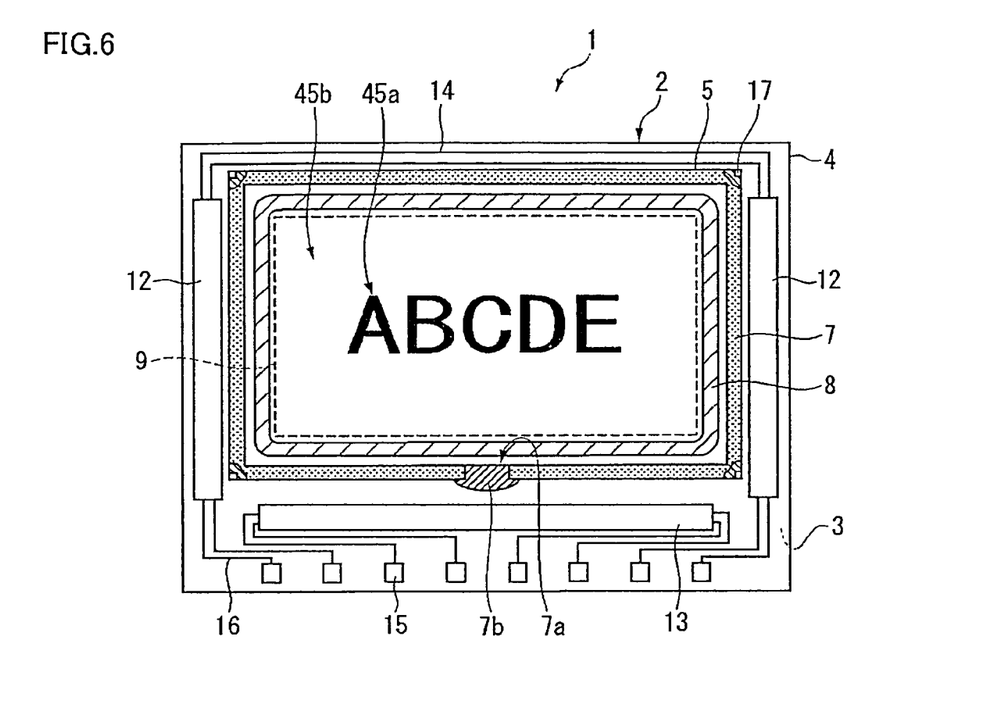
FIG. 6 is a plan view illustrating the structure of the liquid crystal display device in the first embodiment.

Light incidenting at the regions of the subpixels 20A where the light reflecting layers 45a are provided is totally reflected and, via the liquid crystal layer 6 and color filter layer 50, emerges at the surface (display side) of the TFT array substrate 4. Light incidenting at the regions of the subpixels 20b where the light reflecting layers 45b are provided emerges scattered. As a result, even in the state with the power turned off, an image corresponding to the layout pattern of the light reflecting layers 45a will be displayed, as shown in FIG. 6.

Thus, according to the present embodiment, light reflecting layers 45a that totally reflect light are provided in the subpixels 20A disposed in particular regions of the inner face of the TFT array substrate 4, while light reflecting layers 45b that scatter light are provided in the remaining subpixels 20B, which means that the reflectances of the light reflecting layers 45a and the light reflecting layers 45b can be made to differ. As a result, differences can be created in the display light formed by the light reflecting layers 45a and by the light reflecting layers 45b, by means of the light that is reflected thereat. Thereby, fine adjustment of the brightness or contrast of the display light will be enabled, so that a liquid crystal display device 1 will be obtained that has superior display characteristics, possessing extensive power of expression.

Of particular significance in the present embodiment is the fact that, because the light reflecting layers 45a are constituted to totally reflect light from the color filter substrate 5 and the light reflecting layers 45b are constituted to scatter light therefrom, the quantities of reflected light in the viewing direction that reach the viewer from the light reflecting layers 45a and from the light reflecting layers 45b will differ greatly. Hence, by determining the layout of the light reflecting layers 45a and the light reflecting layers 45b, it will be possible to form display light of any desired pattern.

Additionally, in the present embodiment the alignment of the liquid crystal layer 6 is regulated so as to be in what is termed the normally white mode which means that light will be transmitted therethrough even when the power is off. Thereby, it is possible to display images even when the power is off, and thus the range of expression of images is further broadened.

Although in the first embodiment the color filter substrate 5 has color filter layers 50 provided at the light reflecting layer 45a and reflecting layer 45b portions, color filter layers 50 could alternatively not be provided at such portions. In that case, the display when the power was off would be monochrome.

Also, although the light reflecting layers 45a are designed to have a flat surface so as to totally reflect light that is perpendicular to the plane of the liquid crystal panel, they could alternatively have concavoconvexities formed on their surface so as to scatter the light. If so, the reflectances of the light reflecting layers 45a and the light reflecting layers 45b in the direction perpendicular to the plane of the liquid crystal panel would have to be made to differ from each other.

Second Embodiment

A second embodiment of the invention will now be described. As with the first embodiment, the scales of the drawings are varied as appropriate to show the various members in discernible sizes.

Figure 7:
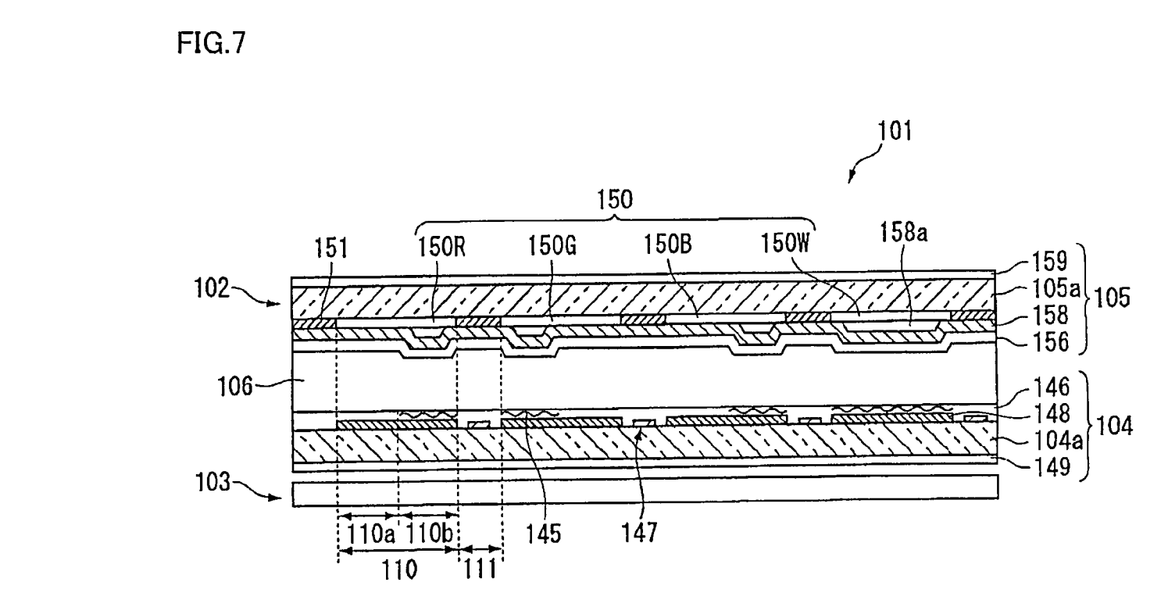
FIG. 7 is a cross-sectional view illustrating a structure of a liquid crystal display device in a second embodiment of the present invention.

FIG. 7 is a view illustrating a cross-sectional structure of a liquid crystal display device 101 of a second embodiment, corresponding to the view of the first embodiment in FIG. 2.

As FIG. 7 shows, the liquid crystal display device 101 has a liquid crystal panel 102 and a backlight 103. The liquid crystal panel 102 is composed of a TFT array substrate 104, a color filter substrate 105, and a liquid crystal layer 106 sandwiched between those substrates, as main elements. As in the first embodiment, the alignment of the liquid crystal molecules of the liquid crystal layer 106 is regulated by an alignment film 146 and alignment film 156 so as to transmit light when no voltage is applied ("normally white mode").

The color filter substrate 105 is composed, as in the first embodiment, of a substratum 105a, a color filter layer 150, a light blocking film 151, a common electrode 158, and an alignment film 156, as main elements. The color filter layer 150 is made up of layers of four colors: a red layer 150R, a green layer 150G, a blue layer 150B, and a white layer 150W. The white color layer 150W may be formed simply as transparent layer. The red layer 150R, green layer 150G, blue layer 150B and white layer 150W are each laid out in rows that are adjacent. Four subpixels 110 that are adjacent to each other and possess the differing color layers of the color filter layer 50 form a set which constitutes one pixel.

The light reflecting layers 145 are, as in the first embodiment, metallic layers constituted of, say, aluminum or the like, and reflect light toward the color filter substrate 105.

Figure 8:
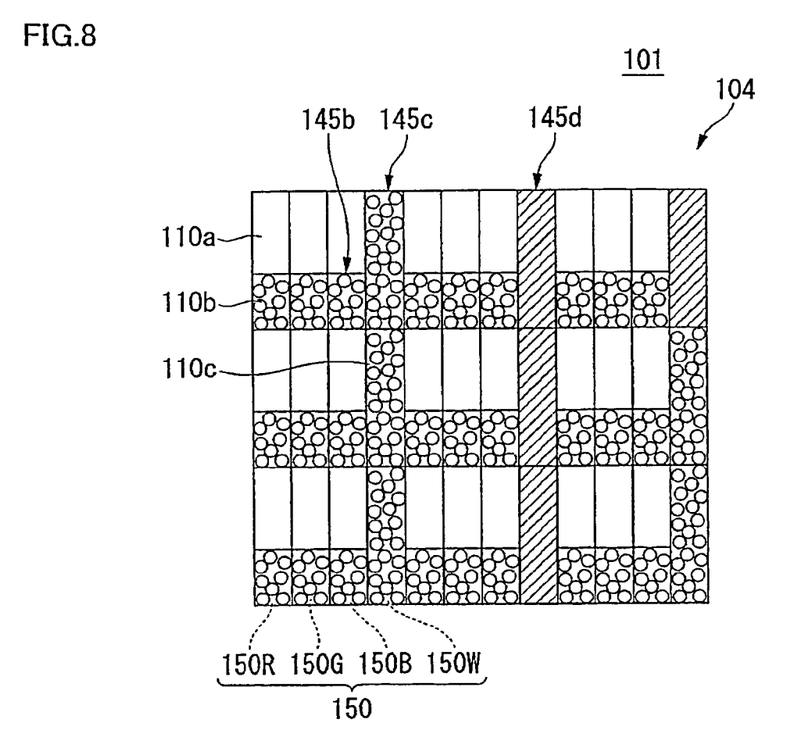
FIG. 8 is a plan view illustrating a structure of a portion of the liquid crystal display device in the second embodiment.

FIG. 8 is a view illustrating a portion of the structure of the TFT array substrate 104 in the liquid crystal display device 101, corresponding to the view of the first embodiment in FIG. 5.

At the subpixels 110 over which, viewed from above, the red layers 150R, green layers 150G and blue layers 150B are superposed, light reflecting layers 145b are provided in regions (say lower regions as in the figure) occupying half of such subpixels 110.

The regions of the subpixels 110 where the light reflecting layers 145b are provided are the light-reflective regions 110b, and the regions where the light reflecting layers 145a are provided are the light-transmissive regions 110a. In the reflective surfaces of the light reflecting layers 145b, patterns that scatter light are formed. The light reflecting layers 145b are so formed among the subpixels 110 as to produce an identical pattern. Therefore, the display light will be formed evenly among the subpixels 110.

At the subpixels 110 over which, viewed from above, the white layers 150W are superposed, light reflecting layers 145c or light reflecting layers 145d are provided so as to occupy the whole area of such subpixels 110. Subpixels 110 that are provided with light reflecting layers 145d are indicated by slant lines in FIG. 7. Such subpixels 110 constitute entirely of a light-reflective region. Patterns that scatter light are formed in the reflective surfaces of the light reflecting layers 145c, and patterns that totally reflect light are formed in the reflective surfaces of the light reflecting layers 145d.

In the liquid crystal display device 101 structured in the foregoing manner, external light passes through the color filter layer 150 of the color filter substrate 105, and through the normally-white-mode liquid crystal layer 106. Light incidenting at the light-transmissive regions 110a among the subpixels 110 of the TFT array substrate 104 passes through the pixel electrodes 148 and substratum 104a, then is blocked by the polarization plate 149. Light incidenting at the light-reflective regions 110b is reflected by the light reflecting layers 145.

Light incidenting at the regions where the light reflecting layers 145d are provided is totally reflected and, via the liquid crystal layer 106 and color filter layer 150, emerges at the surface (display side) of the TFT array substrate 104. Light incidenting at the regions where the light reflecting layers 145b and 145c are provided emerges scattered. As a result, even in the state with the power turned off, an image corresponding to the layout pattern of the light reflecting layers 145d will be displayed.

Figure 9:
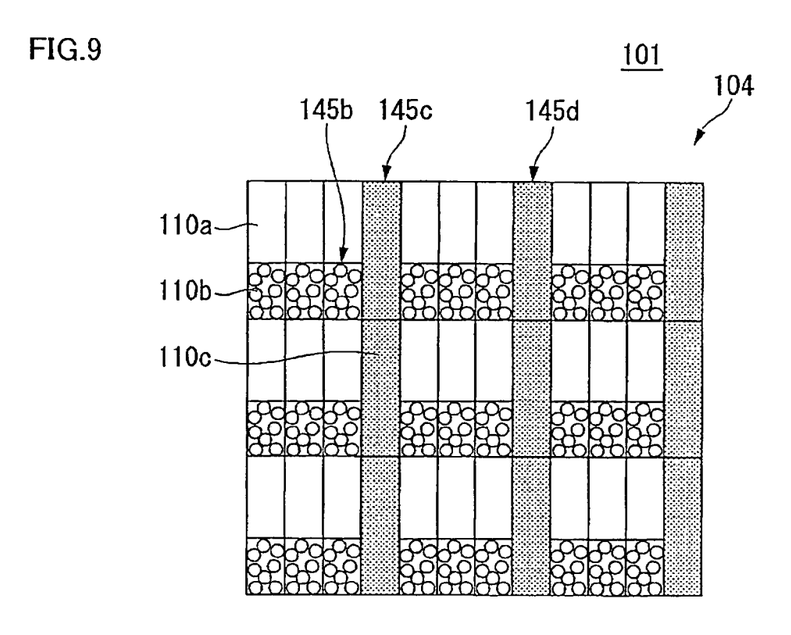
FIG. 9 is a plan view illustrating a state of the liquid crystal display device of the second embodiment when driven.

When this liquid crystal display device 101 is driven, the alignment of the liquid crystal layer 106 will preferably be regulated so that when the backlight 3 is lit, the subpixels 110c that are provided with light-reflective regions occupying their entire areas are displayed black, as shown in FIG. 9. As a result, light will be absorbed by the liquid crystal layer 106 at the subpixels 110.

According to the invention, light reflecting layers 145c and 145d are provided so as to occupy the entire area of some subpixels 110, which means that such subpixels 110 can be used as subpixels for reflective displays. This will enable white display or black display to be determined independently for the subpixels 110. In the particular case of the present embodiment, when the liquid crystal display device 101 is driven, the alignment of the liquid crystal layer 106 will be regulated so that when the backlight is lit, the subpixels 110 where light-reflecting layers 145c and 145d are provided will be displayed black, with the result that mixing of the display light will be prevented. Hence, displays with superior display characteristics will be possible, without complication of the control system.

Although in the second embodiment those subpixels 110 where the light reflecting layers 145b are provided are composed of the light-transmissive region 110a and the light-reflective region 110b, such subpixels could alternatively be formed with the light-transmissive region 110a only, by omitting provision of the light reflecting layers 145b. In that case, the display when the power is off will be realized by means of the difference in the reflectances of the light reflecting layers 145c and light reflecting layers 145d of the subpixels 110c that are provided with light reflective regions occupying their entire areas.

Third Embodiment

A third embodiment of the invention will now be described. As with the first and second embodiments, the scales of the drawings are varied as appropriate to show the various members in discernible sizes.

Figure 10:
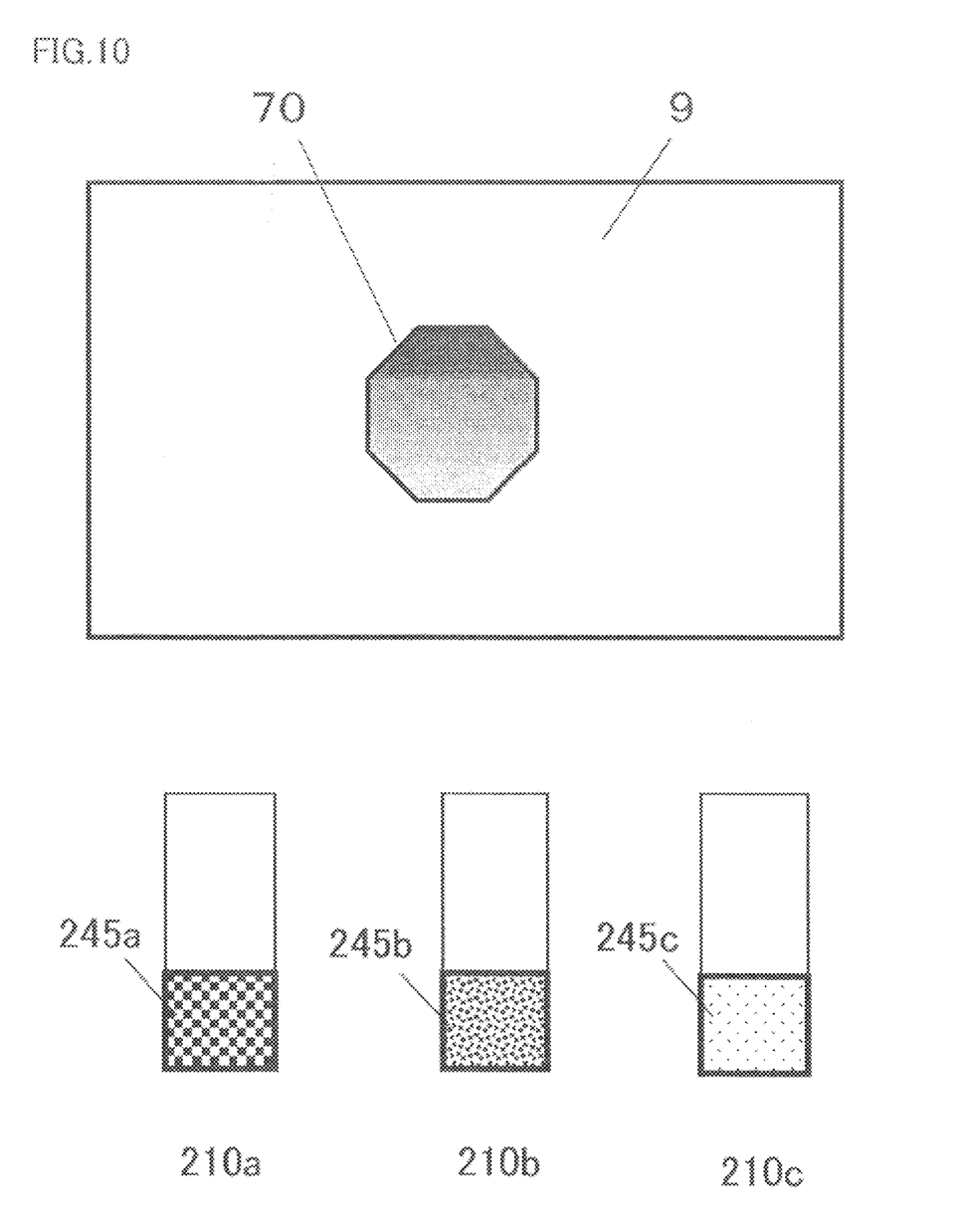
FIG. 10 is a plan view illustrating a structure of a portion of a display device in a third embodiment of the present invention.

FIG. 10 shows the display area 9 of a display device of the third embodiment in the non-driven state. In the display device's display area 9 in the non-driven state, a pattern 70 such as that in the figure is displayed and can be viewed.

This pattern 70 is of a different nature from the "ABCDE" that is displayed in the non-driven state in the first embodiment. That is, whereas the pattern in the first embodiment is displayed by means of the two values white and black only, the pattern 70 is displayed using also tones intermediate between white and black, as the figure shows.

To display the pattern 70, the display device uses subpixels 210a, 210b and 210c (more than three varieties may be used in actual practice).

These subpixels 210a, 210b and 210c each have differing light reflecting layers for their light-reflective regions, or more precisely, differing reflective patterns of the light reflecting layers at their light-reflective regions. A reflective pattern 245a formed in the subpixels 210a has densely formed concavoconvexities, while a reflective pattern 245b formed in the subpixels 210b has concavoconvexities formed more sparsely than the reflective pattern 245a. A reflective pattern 245c formed in the subpixels 210c has concavoconvexities formed smaller than in either of the other subpixel varieties.

Thus, through the use of multiple subpixel varieties with differing reflective patterns, tones intermediate between white and black, such as in the pattern 70, can be displayed with ease.

The foregoing embodiments are given by way of example, and not by way of limiting the technical range of the invention. The examples given could be varied appropriately to encompass various other embodiments without departing from the intent and spirit of the invention.

For instance, although in the foregoing embodiments the reflectances of the light reflecting layers that totally reflect light are described as being equal, the invention is not limited to this, and the display device could be so designed that, say, the light reflectance differs with each subpixel 110. Thereby, it will be possible to impart differences in display light brightness and contrast among the subpixels 110, and thus the range of expression will be further broadened.

Also, although in the foregoing embodiments the thicknesses of the light reflecting layers that totally reflect light are described as being equal, the invention is not limited to this, and the display device could be so designed that, say, the light thickness differs with each subpixel 110. Thereby, it will be possible to impart differences in the cell gap among the subpixels 110. By imparting differences in the cell gap, it will be possible to impart differences in display light brightness and contrast, and thus the range of expression will be further broadened.

Also, although in the foregoing embodiments the alignment of the liquid crystal layer is regulated so that all the regions thereof are in the normally white mode, the invention is not limited to this. Alternatively for example, the liquid crystal layer's alignment could be regulated partially so that only the regions with subpixels that implement total reflection at their light reflecting layers are in the normally white mode.

Also, although in the foregoing embodiments the structure is such that light reflecting layers are disposed at all the subpixels, the invention is not limited to this. Alternatively for example, the structure could be such that light reflecting layers are disposed only at portions that display a particular pattern when the power is turned off, and no light reflecting layers are disposed at other portions.

Also, although in the first embodiment the light reflecting layers in the light reflective regions are described as having reflective patterns made up of concavoconvexities, the invention is not limited to reflective patterns as concerns the light reflecting layers. That is, with the present invention, it is by realizing darkness/lightness via the quantities of light that are reflected that patterns are displayed when the display device is in the non-driven state, and this means that the "differing light reflecting layers" can be achieved not only through differing reflective patterns produced by concavoconvexities, but alternatively through varying the thicknesses of the light reflecting layers so as to vary the quantities of light that are reflected.

Also, although in the first embodiment, pixel electrodes 48 are formed at the light-reflective regions of the subpixels that display the patterns in the non-driven state, so that the alignment of the liquid crystal molecules in the liquid crystal layer 6 is altered even when the liquid crystal display device is in the driven state, it will alternatively be possible, by for example not providing pixel electrodes 48 at such portions, not to alter the alignment of the liquid crystal molecules in the driven state of the liquid crystal display device.

Also, although the descriptions of the first and second embodiments concerned a liquid crystal display device, the invention is not limited to liquid crystal display devices, and could equally well be applied to other display devices, such as what are termed organic EL display devices or what are known as electronic paper display devices.

What is claimed is:
1. A display device comprising:
   a display area constituted of subpixels arranged in a matrix;
   some of the subpixels comprising light-transmissive regions, and some of subpixels constituted only of light-reflective regions of light reflecting layers; and
   patterns being displayed in the display area when the subpixels of the display device are in a non-driven state, through the use of light reflecting layers of at least two differing types in the subpixels constituted only of the light-reflective regions such that light reflectance properties for the two types of light reflecting layers are different from one another in a direction perpendicular to a plane of the display device, wherein the subpixels include a first subpixel provided with a white or transparent color filter and a second subpixel provided with a color filter of any one of at least three colors of red, green and blue, the first subpixel is constituted only of the light-reflective regions, and the second subpixel comprises the light-transmissive region and the light-reflective regions.

2. The display device according to claim 1, further comprising:

a first substrate and a second substrate that are disposed opposing each other, and a liquid crystal layer that is sandwiched between the first substrate and the second substrate;

wherein, in the non-driven state, at least the light-reflective regions are in a normally white mode that is displayed as white.

3. A display device comprising:

a display area including a plurality of subpixels arranged in a matrix, the subpixels include first subpixels provided with a white or transparent color filter and second subpixels provided with a red, green or blue color filter, wherein the second subpixels include a light-transmissive region and a light-reflective region, whereas the first subpixels only include a light-reflective region, and wherein the first subpixels include light reflecting layers of at least two differing types that have different light reflectance properties in a direction perpendicular to a plane of the display device.

* * * * *